_____

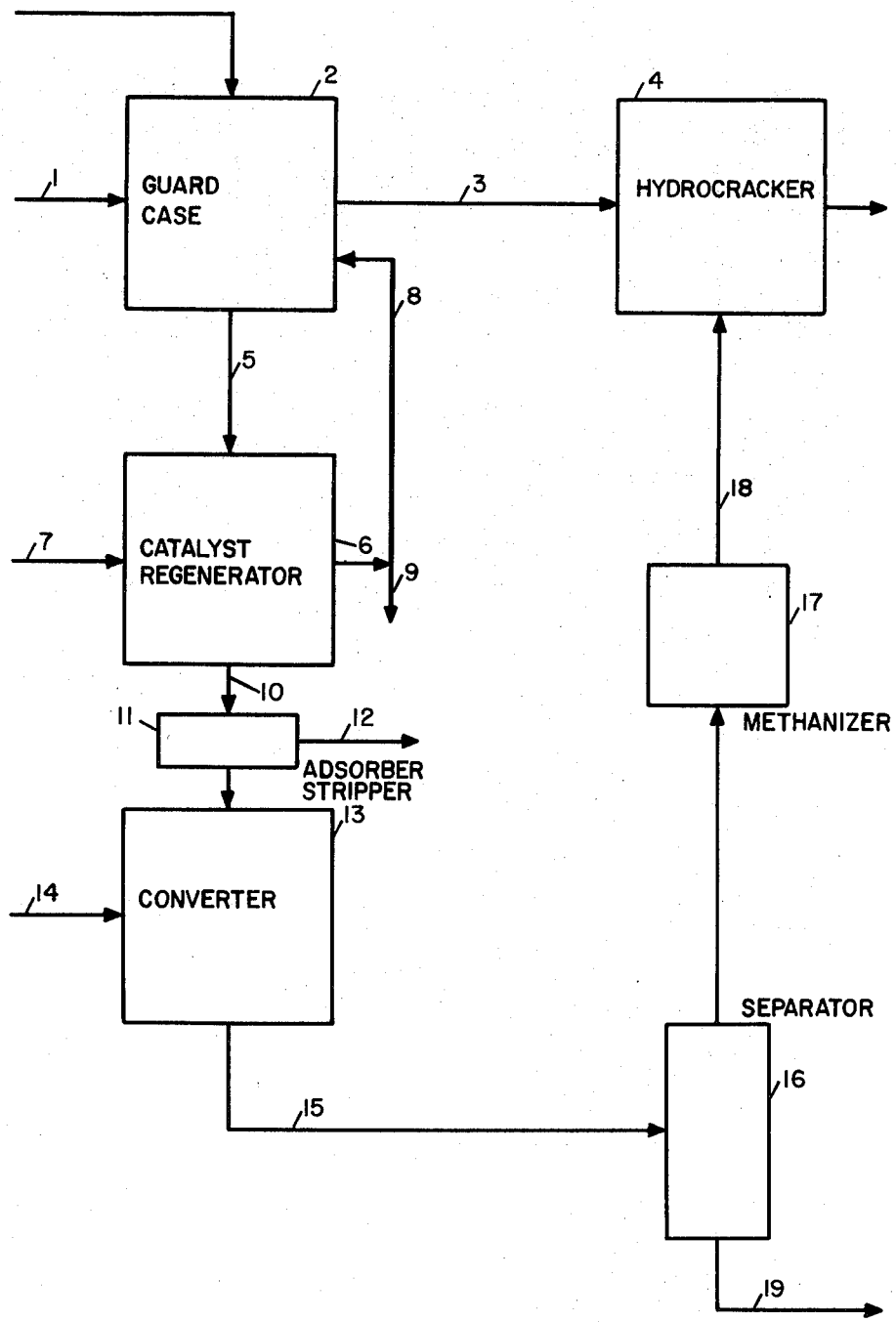

United States Patent Office

3,691,063
Patented Sept. 12, 1972

_____

3,691,063
RESIDUAL FUEL OIL HYDROCRACKING PROCESS
Merritt C. Kirk, Jr., Thornton, Pa., assignor to Sun Oil Company, Philadelphia, Pa.
Filed Mar. 18, 1971, Ser. No. 125,644
Int. Cl. C10g 25/00, 31/14, 37/00
U.S. Cl. 208—91    6 Claims

---

ABSTRACT OF THE DISCLOSURE

Process of hydrocracking residuum containing petroleum wherein the metals which poison the hydrocracking catalyst are removed in a guard case containing an acid catalyst along with the asphaltenes contained in the residuum. The guard case catalyst is regenerated with steam and oxygen to maximize hydrogen production obtainable by partial oxidation of the asphaltenes, and which hydrogen is then used in the hydrocracking process.

---

BACKGROUND OF THE INVENTION

Known hydrocracking processes are unable to be used on asphaltic, high metals content petroleum residuums due to rapid catalyst poisoning and other problems. In the past, this problem has been avoided by limiting the end boiling point of the stock being hydrocracked to about 850° F. so as to avoid the presence of asphaltic or high metals charge stock. Such a process is described in J. W. Scott, Jr. United States Patent 2,944,006, issued July 5, 1960. Another process for hydrocracking which enables the use of a higher boiling feedstock is described in H. A. Frumkin et al. United States Patent 3,227,645, issued Jan. 4, 1966, and involves a distillation, deasphalting of the residuum, and separate demetalizing zones for the overheads and the residuum and downstream catalytic cracking and hydrocracking.

SUMMARY OF THE INVENTION

The present invention relates to a simplified hydrocracking process wherein a fraction of crude containing residuum is first charged to a guard case to remove metals and asphaltic material. The catalyst in the guard case is then regenerated in such a manner as to produce hydrogen for use in the hydrocracking operation. The overall process is more readily understood by reference to the drawing.

DESCRIPTION OF THE DRAWING

The drawing is an overall flow sheet of the process of the invention.

In carrying out the process of the present invention petroleum containing residuum is fed through line 1 into guard case 2. Guard case 2 contains a catalyst which reduces metals and asphalt. The deasphalted and demetalized petroleum flows from guard case 2 through conduit 3 to hydrocracker 4. The catalyst is transferred by line 5 to catalyst regenerator 6. Steam and oxygen are fed to catalyst regenerator 6 by means of line 7. The regenerated catalyst is recycled to guard case 2 by means of line 8. Spent catalyst containing adsorbed metals is removed from the system as desired by means of line 9. The carbon monoxide and hydrogen formed in the catalyst regenerator 6 are fed by means of line 10 to absorber-stripper system 11 and hydrogen sulfide is removed by means of line 12. Product gases are fed to converter 13 where the carbon monoxide is reacted with additional steam which is fed to converter 13 by means of line 14 to produce a mixture of hydrogen and carbon dioxide. The hydrogen and carbon dioxide are fed by means of line 15 to separator 16 where the carbon dioxide is separated from the hydrogen which is purified in methanizer 17 and fed to hydrocracker 4 by means of line 18. The carbon dioxide is released to the atmosphere by means of line 19.

Suitable catalysts for use in the guard case are high surface materials such as alumina or any of the various acid cracking catalysts such as silica alumina, and the various modified silica aluminas, including the zeolites. Generally, the catalyst should have a surface area of at least 100 m.$^2$/gm. Generally spent catalyst from a catalytic cracker is a suitable economical catalyst for use in the guard case. The guard case is operated at a temperature of from 600 to 1000° F. The pressure is not particularly critical and any pressure up to 50 p.s.i.g. is satisfactory although low pressures of from 10 to 30 p.s.i.g. are preferred for economic reasons. The liquid hourly space velocity of the residuum containing petroleum through the guard case is generally from 0.5 to 3.0 v./hr./v.

The guard case catalyst regenerator generally is operated at from 1000 to 1600° F. and a pressure of from 15 to 50 p.s.i.g. Generally the oxygen and steam are fed to the catalyst regenerator in a ratio of from 0.1 to 0.2 volume of oxygen per volume of steam. The amount of oxygen supplied to the system is limited so as to maximize the production of hydrogen and in general is used only in the amount necessary to support sufficient combustion of the adsorbate on the catalyst to raise the temperature to the desired range so as to promote the hydrogen producing reaction between the steam and the organic adsorbate. The residence time of the catalyst in the regenerator generally is from 0.1 to 0.5 hour. The catalyst becomes loaded with asphalts and metals while in the guard case. Generally the catalyst is allowed to adsorb from 1 to 10 weight percent of such asphalts and metals as based on the weight of the catalyst before it is necessary to regenerate it. Normally petroleum containing at least 90 weight percent material boiling over 1000° F. is charged to the guard case in order for there to be adequate asphalts absorbed so that there are sufficient combustibles to operate the process as a hydrogen producing scheme.

The hydrogen plus carbon monoxide effluent from the catalyst regenerator is fed to a two-stage water-gas shift converter where steam is reacted with the carbon monoxide to form additional hydrogen and carbon dioxide. The first stage of the water-gas shift reactor is operated at a temperature of from 750 to 950° F. and the second stage at from 450 to 520° F. A pressure of from 320 to 360 p.s.i.g. is used in both stages. The residence time in the reactor is from 15 to 45 seconds. Conventional carbon dioxide removal and methanization equipment are employed to produce a pure hydrogen stream for the hydrocracking operation.

The hydrocracking as used in the present process is operated so as to produce principally relatively light isoparaffins which are useful as high octane gasoline blending components or a reformer feed which, on reforming, yields a high octane gasoline. Generally the hydrocracking is carried out at a pressure of from 350 to 2000 p.s.i.g. with from 500 to 1500 p.s.i.g. being the preferred range. The hydrocracking is carried out at a temperature of from 400 to 700° F. with from 425 to 650° F. being the preferred range. The hydrogen consumption is at least 500 s.c.f. of hydrogen per barrel of feed. The catalyst generally is a sulfide of one or more metals of Groups V, VI, VII or VIII incorporated in or supported on a carrier which has cracking activity. Preferred catalysts are nickel, cobalt, nickel-molybdenum, nickel and tungsten, cobalt-molybdenum and cobalt-tungsten. Preferred supports for the catalyst are alumina and silica-alumina. Using these relatively mild conditions renders this class of catalysts particularly sensitive to fouling and poisoning with metals.

DESCRIPTION OF THE PREFERRED EMBODIMENT

The fraction of a west Texas crude boiling above 1000° F. and having the following properties:

| | |
|---|---|
| Specific gravity | 1.0 |
| Percent S | 3.2 |
| Percent N | 0.4 |
| Metals, p.p.m.: | |
| Fe | 10 |
| V | 50 |
| Ni | 30 | is fed to a guard case at a flow rate of 0.5 LHSV. The guard case is filled with a silica-alumina catalyst in the form of spheres. The guard case is maintained at 850° F. and a pressure of 20 p.s.i.g. After 30 minutes the guard case is shut down and the catalyst removed and found to contain 9 weight percent adsorbate which is principally asphaltenes. A major portion of the metals contained in the original crude are contained in the adsorbate. The adsorbate is charged to a catalyst regenerator which is operated at 1400° F. and 40 p.s.i.g. A gaseous mixture of 15 volume percent oxygen and 85 volume percent steam is continuously fed to the regenerator while a gaseous mixture of hydrogen, carbon monoxide and steam is removed, at a rate sufficient to provide for a 30 second residence time of the gases in the reactor. After cooling and separating water the product gases are fed to an absorber-stripper system for removal of hydrogen sulfide. The effluent gases are mixed with steam and continuously fed to a converter in a volume to volume ratio of 2.2 to 1 steam to mixed effluent gases. The two-stage water-gas shift converter is operated at a temperature of from 850° F. (first stage) and 485° F. (second stage) and a pressure of about 350 p.s.i.g. The residence time of the gases in the converter is 30 seconds. The gases removed from the converter consist essentially of hydrogen and carbon dioxide. These gases are fed to an absorber-stripper system for removal of carbon dioxide. Traces of residual carbon monoxide and carbon dioxide are hydrogenated in a methanizer and pure hydrogen is then compressed and fed to the hydrocracker.

The hydrocracker contains a supported nickel catalyst prepared from 8–14 mesh 10 percent silica 90 percent alumina cracking catalyst which has been soaked with aqueous nickel nitrate for a period sufficient to absorb 3.5 percent by weight nickel nitrate. The catalyst is then reduced to elemental nickel with hydrogen and then presulfided. During hydrocracking, the hydrocracker is maintained at 1200 p.s.i.g. and 550° F. The crude fracion from the guard case is flowed through the hydrocracker at a LHSV of 1.5. The hydrogen is consumed at a rate of 4000 s.c.f./bbl. and is recycled to the system at a rate of 12,000 s.c.f./bbl. The volume percent yield of $C_{5+}$ gasoline fraction is in excess of 50 percent and contained $C_5$ and $C_6$ paraffins having an iso/normal ratio of about 10.5:1.

The invention claimed is:

1. A process comprising charging a petroleum fraction at least 90 weight percent of which boils above 1000° F. to a guard case maintained at from 600 to 1000° F. and containing an acid cracking catalyst, whereby metals and asphaltenes contained in the petroleum are adsorbed by said catalyst, steam-oxygen regenerating said catalyst to produce hydrogen, and hydrocracking the petroleum effluent from said guard case at a pressure of from 350 to 2000 p.s.i.g. and a temperature at from 400 to 700° F. using a supported sulfide of a Group V, VI, VII or VIII metal as catalyst.

2. The process of claim 1 wherein the hydrogen consumption in the hydrocracking step is at least 500 standard cubic feet of hydrogen per barrel of petroleum feed.

3. The process of claim 2 wherein the guard case is operated at from 600 to 1000° F. and the petroleum fraction is fed therethrough at from 0.5 to 3.0 volumes of petroleum fraction per volume of catalyst in the guard case per hour.

4. The process of claim 3 wherein the catalyst in the hydrocracking step is supported on silica-alumina or alumina.

5. The process of claim 4 wherein the catalyst in the hydrocracking step is a sulfided form of nickel, nickel-tungsten, nickel-molybdenum, cobalt, cobalt-tungsten or cobalt-molybdenum.

6. The process of claim 5 wherein the catalyst from the guard case is regenerated by contacting said catalyst with oxygen and steam in a volume to volume ratio of from 0.1:1 to 0.2:1 oxygen to steam at a temperature of from 1000 to 1600° F., to produce a mixture of hydrogen and carbon monoxide and which carbon monoxide is further reacted with steam to produce carbon dioxide and additional hydrogen.

References Cited
UNITED STATES PATENTS

| | | | |
|---|---|---|---|
| 2,944,006 | 7/1960 | Scott | 208—109 |
| 3,227,645 | 1/1966 | Frumkin et al. | 208—89 |
| 3,373,102 | 3/1968 | Schulman | 208—91 |

DELBERT E. GANTZ, Primary Examiner

G. E. SCHMITKONS, Assistant Examiner

U.S. Cl. X.R.

48—197 R; 208—86, 108; 252—419